United States Patent [19]
Sykes

[11] Patent Number: 5,529,204
[45] Date of Patent: Jun. 25, 1996

[54] SELECTIVELY FLOATABLE MINNOW BUCKET

[76] Inventor: Willard Sykes, 13090 182nd St. N., Marine on St Croix, Minn. 55047

[21] Appl. No.: 199,113

[22] Filed: Feb. 22, 1994

[51] Int. Cl.⁶ .................................................. B65D 43/24
[52] U.S. Cl. .................. 220/335; 43/55; 43/56; 220/560
[58] Field of Search ................... 43/55, 56, 57; 220/335, 560, 525, 555; 441/135, 136, 21, 29; 134/156

[56] References Cited

U.S. PATENT DOCUMENTS

| | | | |
|---|---|---|---|
| 2,503,856 | 4/1950 | Ward | 43/56 |
| 4,019,274 | 4/1977 | Landell et al. | 43/56 |
| 4,260,070 | 4/1981 | Pierson | 43/56 |
| 5,123,198 | 6/1992 | Von Grossmann | 43/56 |

*Primary Examiner*—David Scherbel
*Assistant Examiner*—Reginald L. Alexander
*Attorney, Agent, or Firm*—Friederichs Law Firm

[57] ABSTRACT

A selectively floatable minnow bucket, including at least one wall, a gate, a plurality of openings and at least one floatation mechanism, the wall and gate defining a hollow cavity for maintaining live bait, the openings allowing the flow of water in and out of the bucket in order to maintain a fresh water supply to the live bait, and the floatation mechanism including at least one wall, a hollow channel, and plugs or stopcocks, into which substances of various densities such as water, air, or sand are introduced to affect the buoyancy of the minnow bucket.

20 Claims, 1 Drawing Sheet

SELECTIVELY FLOATABLE MINNOW BUCKET

FIELD OF INVENTION

The present invention relates to containers suitable for retaining live bait and in particular to minnow buckets.

BACKGROUND OF INVENTION

For as long as the sport of fishing has existed, anglers have used live bait to catch fish. The use of live bait presents a problem to the angler. The angler needs to keep the live bait in a container so that there is easy access. When bait is kept in a container, it tends to die and become useless to the angler. This problem is particularly acute when the live bait is minnows. The two primary methods by which the lives of the minnows are extended is exchanging the water in the minnow bucket and controlling the temperature of the water holding the minnows.

Originally, minnow buckets were simply a pail that held water and minnows. The pail was kept either in the boat or on shore. To extend the life of the minnows the angler would occasionally exchange the old water in the pail for fresh water from the lake or stream. This method does not work well, since it is difficult to keep the minnows in the bucket while water is being removed from the bucket.

Eventually minnow buckets were developed that floated in the lake or stream. These floating minnow buckets completely encased the minnows inside the buckets. They included holes through the sidewalls that allowed for the free exchange of water inside the pail with water outside the pail. Sometimes water is exchanged by pouring the water out through the holes and then placing the bucket back in the water to refill. The exchange of water, however, usually occurs when the water outside the pail moved relative to the pail. Such an occurrence would take place when the angler trolled in a lake or remained stationary in a stream. Water is not exchanged well when still-fishing in a lake or drifting in a stream. In such a case, the angler still needs to pour the water out of the floating minnow bucket and exchange it with fresh water from the surrounding area.

The second method of extending the life of the minnows is through controlling the temperature of the water. The water adjacent to the top surface of a lake or stream tends to be warm. Warm water does not retain oxygen very well and is the primary cause of the death of minnows retained in buckets. In particular warm water can kill minnows in minutes, while minnows retained in cold water can remain alive for weeks. Water below the top surface tends to be cooler. Consequently, anglers have also used sinking minnow buckets. Sinking minnow buckets work when still-fishing. They provide little advantage when trolling and actually create problems for the angler in such a situation. Particularly, the angler experiences a more difficult time in getting bait out of the minnow bucket and may have the minnow bucket get tangled in the motor.

SUMMARY OF PRESENT INVENTION

The present invention incorporates the advantages of previous minnow buckets without their disadvantages. The bucket has holes allowing for the free exchange of water. In still-fishing, the bucket may be sunk to bring the minnows to cooler water which contains more oxygen. In trolling, the bucket may be floated so that it does not get tangled in the motor. Sinking and floating the bucket is accomplished through floatation devices by which the bucket's buoyancy can be adjusted.

The minnow bucket has a top, a bottom and at least one side wall defining at least one opening. The opening in the sidewall is covered by a gate which prevents the bait from escaping, but allows the angler access to the bait. The gate may have holes which allow the flow of water in and out of the bucket in order to maintain a fresh water supply to the bait. There may also be other holes in the bucket through which water flows. There may be constant free exchange of water inside the pail with water outside the pail through such holes.

Floatation devices are attached to the minnow bucket. A floatation device has a top wall, at least one side wall, and a bottom wall. These walls define a channel. The channel is a hollow portion of the floatation device with at least one opening through which water or air flow. If the channel has at least two openings, the openings may work together to allow flow of a desired substance into floatation device while allowing an undesirable substance to escape from the floatation device. A mechanism for selectively opening and closing the openings may be used to let substances pass through the floatation device. For instance, a plug may be removed or replaced as needed to vary the amount of air or water in the floatation device. Likewise, a stopcock may be adjusted to vary the amount of air or water. Using the plug or stopcock, a desired substance is held within the channel. The plug or stopcock also allows escape of the substance in the channel when the substance is no longer desired.

The bucket's buoyancy may be changed by varying the amount of water and air in the channel. If an angler wishes to sink the bucket in order to keep the bait in cooler water, more water is let into the channel while more air is let out of the channel. If an angler wishes to float the bucket while trolling, more air is let into the channel while more water is let out of the channel. Varying the amount of air and water modifies the average density in the channel. The average density inside the channel is the total weight of all substances inside the channel divided by the volume inside the channel. Varying the average density is the procedure actually causing the bucket to sink or float.

IN THE DRAWINGS

FIG. 1 illustrates a front view of an embodiment of the present invention partially broken away; and FIG. 2 illustrates a bottom view of an embodiment of the present invention.

DETAILED DESCRIPTION OF THE INVENTION

Figure 1:
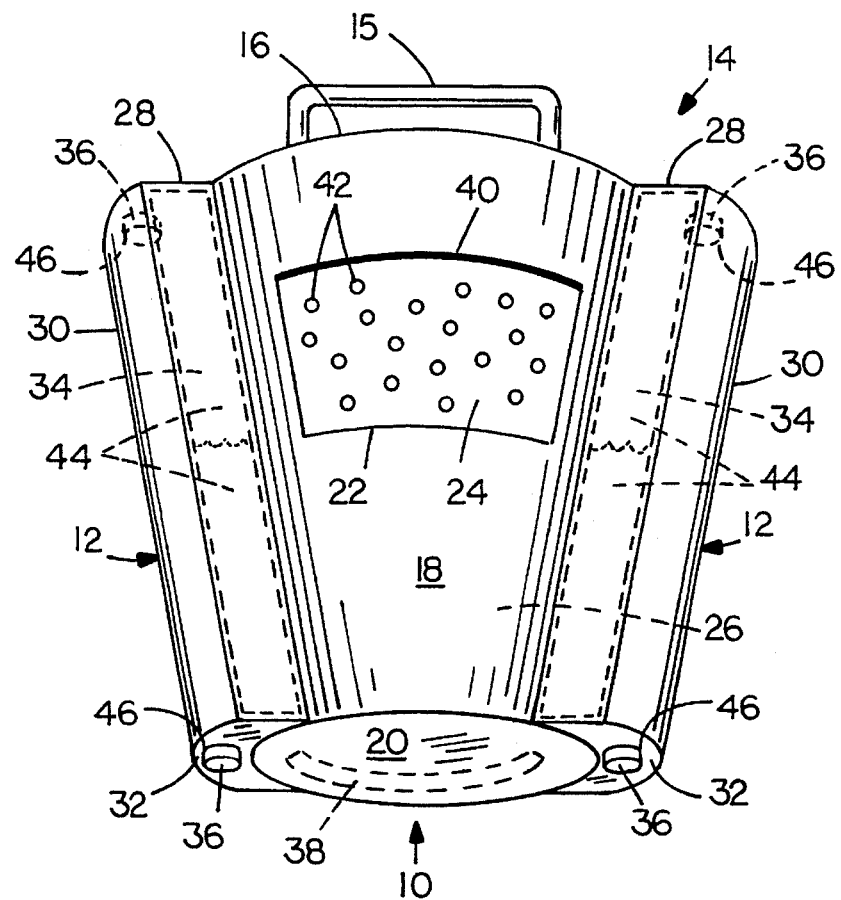
Figure 2:
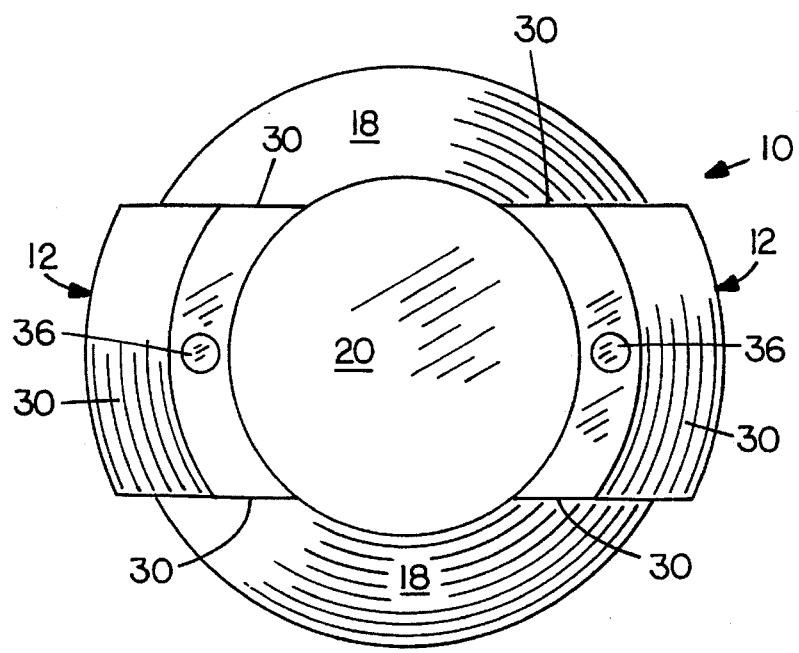

The minnow bucket 10 of this invention incorporates the advantages of previous minnow buckets without their disadvantages. In still-fishing, the bucket 10 may be sunk to bring the minnows to cooler water which contains more oxygen. In trolling, the bucket 10 may be floated so that it does not get tangled in the boat's motor. Sinking and floating the bucket 10 is accomplished through floatation devices 12 by which the buoyancy of the bucket 10 can be adjusted.

The minnow bucket 10 consists of two major components. The first major component is the bucket portion 14. The bucket portion 14 includes a handle 15, a number of walls 16, 18, 20, an opening 22 and a gate 24, which define a hollow interior cavity 26 in which to hold live bait. The second major component is the floatation device 12. The floatation device 12 includes walls 28, 30, 32, a hollow channel 34, and a stopper mechanism 36. The floatation device 12 is used to vary the buoyancy of the minnow bucket 10. The features of the two major components are discussed below.

The first major component is the bucket portion 14. The bucket portion 14 may be frustoconical, cylindrical, rectangular, or one of a number of different shapes. The parts of the bucket 14 may be constructed or formed from plastic, metal, fiberglass or a number of different materials. The bucket 14 may be one or more of a number of different colors. The bucket 14 has a top wall 16, a bottom wall 20 and at least one side wall 18. Such walls 16, 18, 20 may be integral or bonded adjacent to each other. The side walls 18 may be circular, square, or one of a number of different shapes in horizontal cross-section. The function of the walls 16, 18, 20 is to define an internal cavity 26 for retaining live bait. The top wall 16 may be connected to a handle 15, which the angler can conveniently use for lifting the minnow bucket 10.

The side wall or walls 18 may define the opening 22. Alternatively the top wall 16 may define the opening 22. The opening 22 may be rectangular, trapezoidal, or one of a number of different shapes. The opening 22 is the mechanism by which live bait is transferred into and out of the bucket 14. The opening 22 in the sidewall 18 is covered by a selectively moveable gate 24 which prevents the live bait from escaping, but allows the angler access to the bait. This gate 24 may be the same shape as the opening 22 in the side wall or walls 18. The gate 24 may be detachable or attached to the sidewall 18 by a spring, a sliding track, a hinge, or one of a number of different attachments. The gate 24 may be constructed or formed from plastic, metal, fiberglass or a number of different materials. The gate 24 has two functions. First, the gate 24 allows the angler to add bait to or retrieve bait from the bucket 14. Second, the gate 24 forms a barrier preventing the bait from escaping.

The bucket portion 14 may contain a weight 38 which sinks at least a portion of the minnow bucket 10 in the water to keep the live bait covered by water. The weight 38 is typically placed along the bottom wall 20 on the side opposite the opening 22. Such placement causes the bucket 10 to tip lifting the gate 24 out of the water to prevent the minnows from escaping should the gate 24 be opened inadvertently.

The walls 16, 18, 20 and the gate 24 may define holes 42 which allow the flow of water in and out of the bucket 14 in order to maintain a fresh water supply to the live bait. The holes 42 may be circular, polygonal or a number of different shapes. The holes 42 in the gate 24 and sidewalls 18 allow for constant free exchange of water inside the bucket 14 with water outside the bucket 14. The holes 42 must be large enough to adequately allow the flow of water through the bucket 14, yet small enough to prevent the live bait from escaping.

The second major component is the floatation device 12. At least one floatation device 12 is attached to the side wall or walls 18 of the bucket portion 14. Alternatively, the floatation device 12 may be attached to the top wall 16 of the bucket portion 14. The floatation device 12 may be circular, cylindrical, rectangular or one of a number of different shapes. The floatation device 12 may be constructed or formed from rigid or flexible plastic, metal, fiberglass or a number of different materials. The floatation device 12 may be formed or constructed of the same material as the bucket portion 14. The floatation device 12 may have a top wall 28, at least one side wall 30, and a bottom wall 32. The side walls 30 of the floatation device 12 may be circular, square, or one of a number of different shapes in horizontal cross section. The function of the walls 28, 30, 32 of the floatation device 12 is to define an interior channel 34. The interior channel of the floatation device 12 is an area into which substances 44 are introduced to affect the buoyancy of the minnow bucket 10. The substances 44 may include water, air, sand, other materials of various densities or multiples thereof.

The channel 34 is a hollow portion of the floatation device 12. The channel 34 may take the shape of the floatation device 12. The channel 34 has at least one opening 46 through which water, air, or other substances 44 enter the channel. The channel 34 has at least one opening 46. If a plurality of openings 46 are present, the openings 46 may work together to allow flow of a desired substance 44 into the floatation device 12 while allowing an undesirable substance 44 to escape from the floatation device 12. For example, removing air and adding sand or another weight through the opening 46 in the channel 34 will cause the minnow bucket 10 to sink deeper into the water.

A stopper mechanism 36 such as a plug or stopcock may be used to let substances 44 such as water or air pass into the floatation device channel 34. The plug or stopcock 36 is sized and shaped to be snugly received in the channel opening or openings 46. The plug or stopcock 36 may be constructed or formed from plastic, metal, fiberglass, rubber or a number of different materials. A plug 36 may be removed or replaced as needed to vary the amount of the substance 44 in the floatation device 12. Likewise, a stopcock 36 may be adjusted to vary the amount of the substance 44 in the channel 34. Using the plug or stopcock 36, a desired substance 44 is held within the channel 34. The plug or stopcock 36 also allows escape of the substance 44 from the channel 34 when the substance 44 is no longer desired.

The stopper mechanism 36 should preclude escapage of a desired substance 44. The stopper mechanism 36 also selectively allows exchange of a desired substance 44 for a retained and undesired substance 44. Consequently, the stopper mechanism 36 does not need to provide an air tight seal if air is not used as a substance 44. Nor does the stopper mechanism 36 need to be a plug or stopcock. The stopper mechanism 36 merely needs to provide selective exchange and retainment of substances 44.

In operation, the buoyancy of the bucket 10 may be changed by varying the amount of substances 44 of diverse densities, such as water and air, in the channel 34. If an angler wishes to sink the bucket 10 in order to keep the live bait in cooler water, a more dense substance 44 such as water is let into the channel 34 while a less dense substance 44 such as air is displaced from the channel 34. If an angler wishes to float the bucket 10 while trolling, more air is let into the channel 34 while more water is let out of the channel 34.

The principle on which this invention operates is varying the density of the floatation devices 12, wherein density equals weight divided by volume. Objects more dense than water such as a rock sink to the bottom of the body of water. Objects less dense than water such as air float to the top of the body of water. Likewise the bucket 10 sinks or floats depending on its density in comparison to the density of the surrounding water. Density can be increased by increasing the weight, decreasing the volume or a combination thereof.

In the present invention, the density of the bucket portion 14 does not change. Rather it is the density of the floatation device 12 which is varied. Varying the average density in the floatation device 12 causes the minnow bucket 10 to sink or float. The density of the floatation devices 12 may be increased by decreasing the volume of the floatation devices 12, increasing the weight in the floatation devices 12, or a combination thereof. Decreasing the volume in the floatation device 12 may be achieved by collapsing an inflatable floatation device 12. Increasing the weight in the floatation device 12 may be achieved through replacing air in the floatation device 12 with a more dense substance 44 such as sand or water. Increasing the density of the floatation devices 12 causes a corresponding increase in the density of the minnow bucket 10. Increasing the density of the minnow bucket 10 beyond the density of the water causes the minnow bucket 10 to sink. Decreasing the density of the minnow bucket 10 to less than the density of the water causes the minnow bucket 10 to float.

Although the density of water is relatively constant, the density of water does change from the top to the bottom of the lake. Through careful control of the density of the minnow bucket 10, the bucket 10 could be suspended between the upper and lower surfaces of the water. Such control may be attained through careful balancing of more than one substance 44 in the channel 34 as shown in FIG. 1.

Although the present invention has been described with reference to preferred embodiments, workers skilled in the art will recognize that changes may be made in form and detail without departing from the spirit and scope of the invention.

What is claimed is:

1. A container for retaining live bait comprising:

a bucket, said bucket including a top, a bottom and at least one side wall, said bucket having a bucket opening;

a gate covering said bucket opening, said gate selectively closing said bucket opening to prevent live bait from escaping through said bucket opening; and said gate selectively opening for insertion and removal of live bait;

at least one float, said float having an upper portion, said upper portion having a first float opening, a lower portion, said lower portion having a second float opening, and a center portion, which cooperate to define a channel, said channel being filled with air, and said float being connected adjacent to said bucket; and modification means for modifying the floatational effectiveness of said float; said modification means including said first float opening and said second float opening, a first plug sized to be snugly received in said first float opening and a second plug sized to be snugly received in said second float opening, said first and second plugs being selectively removable from said first and second float openings such that said air within said channel is replaceable with water.

2. A container for retaining live bait comprising:

a bucket, said bucket including a top, a bottom and at least one side wall;

bait removal means for permitting selective removal of bait from said bucket;

at least one float, said float having a channel, said float being connected adjacent said bucket;

a float filler contained in said float, said float filler having a density; and modification means for modifying said float filler density.

3. The container of claim 2 wherein said modification means changes said mass of said float filler.

4. The container of claim 3 wherein said float filler is comprised of air, and said modification means provides for replacement of a portion of said air with water.

5. The container of claim 2 wherein said float filler is comprised of water and air.

6. The container of claim 2 comprising a plurality of floats.

7. The container of claim 6 wherein said floats contain the same types of float fillers.

8. The container of claim 2 wherein said bucket is a minnow bucket.

9. A container for retaining live bait, comprising:

a bucket, said bucket having an opening;

a gate covering said opening in said bucket, said gate selectively closing said opening to prevent live bait from escaping through said opening; and said gate selectively opening for insertion and removal of live bait;

floatation means for selectively providing buoyancy to said bucket; said floatation means being connected to said bucket; and modification means for modifying the density of said floatation means.

10. The container of claim 9 wherein said floatation means further comprises:

a top wall;

at least one side wall joined to said top wall; and a bottom wall joined to said side wall; wherein said top wall, said side wall and said bottom wall cooperatively define a channel.

11. The container of claim 10 wherein said floatation means has a first float opening; wherein said first float opening selectively provides access between an external environment and said channel in said floatation means; and wherein said first float opening is at least a portion of said modification means.

12. The container of claim 11 wherein said first float opening provides a path for at least one substance to flow into said floatation means.

13. The container of claim 12 wherein: said floatation means has a float density, and said modification means modifies said float density.

14. The container of claim 9 wherein said modification means includes a stopcock.

15. The container of claim 9 wherein said modification means includes a plug.

16. The container of claim 9 wherein said modification means modifies the floatational effectiveness of said floatation means from full effectiveness to no effectiveness, including all points of effectiveness therebetween.

17. The container of claim 11 wherein said first float opening is located in said bottom wall, said top wall having a second float opening which selectively provides access between an external environment and said channel, said first float opening and said second float opening being at least a portion of said modification means.

18. The container of claim 17 wherein said first float opening and said second float opening cooperate in modifying the floatation means, one float opening selectively allowing a desired substance into the channel while the other float opening allowing an undesirable substance to escape from said channel.

19. The container of claim 18 wherein said one float opening allows air into the channel while said other float opening allows water to escape from said channel.

20. The container of claim 9 wherein said floatation means has a plurality of openings.

* * * * *